(12) United States Patent
Iwaya et al.

(10) Patent No.: US 6,835,001 B1
(45) Date of Patent: Dec. 28, 2004

(54) OPTICAL FIBER CONNECTOR

(75) Inventors: Mitsuhiro Iwaya, Tokyo (JP); Koji Seo, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/400,549

(22) Filed: Mar. 28, 2003

(30) Foreign Application Priority Data

Mar. 28, 2002 (JP) ........................................ 2002-091672

(51) Int. Cl.$^7$ ............................................... G02B 6/36
(52) U.S. Cl. ....................................................... 385/53
(58) Field of Search ........................... 385/53–58, 85–87

(56) References Cited

U.S. PATENT DOCUMENTS 4,925,266 A * 5/1990 Huebscher et al. ........... 385/78
6,331,081 B1 * 12/2001 Ohtsuka et al. ............... 385/85
6,398,423 B1 * 6/2002 Novacoski et al. ........... 385/78

* cited by examiner

*Primary Examiner*—Khiem Nguyen
(74) *Attorney, Agent, or Firm*—Oblon, Spivak, McClelland, Maier & Neustadt, P.C.

(57) ABSTRACT

An optical fiber connector includes a connector ferrule having an end face serving as a connection end face of the optical fiber connector, and an optical fiber fixed in the connector ferrule and protruding from the end face of the connector ferrule. A central portion of the optical fiber including a core thereof protrudes from a peripheral portion thereof. Thus, even in cases where the connection end face of an optical component to which the optical fiber connector is connected is uneven and a region thereof to which the optical fiber is connected is recessed, the core of the optical fiber can be connected to the region without fail since the core of the optical fiber protrudes from the peripheral portion of same.

9 Claims, 4 Drawing Sheets

OPTICAL FIBER CONNECTOR

CROSS-REFERENCE TO RELATED APPLICATION

This application is based upon and claims the benefits of priority from the prior Japanese Patent Application No. 2002-91672, the contents of which are incorporated herein by reference.

BACKGROUND OF THE INVENTION

1. Field of the Invention

The present invention relates to an optical fiber connector including optical fibers.

2. Description of the Related Art

FIG. 5 is a sectional view illustrating how an optical fiber connector 51 is connected to an optical component 61. The optical fiber connector 51 has a connector ferrule 53 and optical fibers 52 fixed in the connector ferrule. Guide pins 58 of the optical fiber connector 51 are inserted into respective guide holes (not shown) of the optical component 61, whereby the optical fiber connector 51 is connected to the optical component 61.

FIG. 6 is a longitudinal sectional view of the elements appearing in FIG. 5. As illustrated, each optical fiber 52 is fixed in the connector ferrule 53 of the optical fiber connector 51, and typically comprises two silica glass layers with different refractive indices, that is, a core 55 and a cladding 56 surrounding the core 55.

Typically, the dimensions of single-mode fibers commonly used are as follows: The core 55 has a diameter of 5 to 10 $\mu$m, and the cladding 56 has an outer diameter of about 125 $\mu$m.

On the connection end face, of the optical fiber connector 51, each optical fiber 52 protrudes from an end face of the connector ferrule 53 by about several micrometers.

On the other hand, the optical component 61 comprises, for example, an optical waveguide chip 69. Typically, the optical waveguide chip 69 has a structure wherein a cladding 66 corresponding to the claddings 56 of the optical fibers 52 is formed on a substrate 67 of silicon or the like and cores 65 corresponding to the respective cores 55 of the optical fibers 52 are embedded in the cladding 66. Each core 65 has a size of approximately 5 to 10 $\mu$m in width as well as in height, and the cladding 66 has a height of about 50 $\mu$m, for example.

As an exemplary part constituting the optical component 61, a top plate 68 of epoxy resin or the like is affixed to the optical waveguide chip 69 including the substrate 67, cores 65 and cladding 66 so that the optical component 61 may be connected to the optical fiber connector 51.

FIG. 7 is a sectional view exemplifying a state in which the optical fiber connector 51 is connected to the optical component 61. In the illustrated example, the optical component 61 has a connection end face 61a which is flat as a whole inclusive of the end faces of the substrate 67, cladding 66 and cores 65 of the optical waveguide chip and the end face of the top plate 68. Accordingly, the connection end faces 52a of the optical fibers 52 protruding from the connector ferrule in the optical fiber connector 51 can be brought into perfect connection, that is, desirable PC (Physical Contact), with the respective cores 65 of the optical waveguide chip 69.

FIG. 8 is a sectional view illustrating another example of connection between the optical fiber connector 51 and the optical component 61. In the example shown in FIG. 8, the optical component 61 has an uneven connection end face 61b, that is, the cores 65 and the cladding 66 are set back from the substrate 67 and the top plate 68. Such unevenness of the connection end face 61b is often caused during polishing of the end face of the optical component 61 due to difference in abrasion resistance among the layers constituting the optical component, or is caused in high-temperature environments due to difference in the coefficient of thermal expansion among the layers. Thus, in some cases, the cores 65 are set back from the substrate 67 or the top plate 68 by about 0.5 $\mu$m, for example.

In such cases, the optical fibers 52 of the optical fiber connector 51 are obstructed by the most prominent part of the optical component 61, for example, the top plate 68 in the example of FIG. 8, and the cores 55 thereof fail to come into PC with the respective cores 65 of the optical waveguide chip 69, giving rise to a problem of, for example, increased connector insertion loss.

To solve the problem, a method may be employed in which the total thickness of the core 65 and cladding 66 of the optical waveguide chip 69 is made significantly greater than the diameter of the optical fiber 52 so that the optical fibers 52 protruding from the connection end face of the optical fiber connector 51 may not touch the substrate 67 or top plate 68 of the optical waveguide chip 69. However, this method is not preferred in view of costs and time required to manufacture the optical waveguide chips 69.

SUMMARY OF THE INVENTION

An object of the present invention is to provide an optical fiber connector which permits the cores of optical fibers thereof to be connected to an optical component without fail even in cases where the connection end face of the optical component, to which the optical fiber connector is connected, is uneven and a region thereof to which the optical fibers are connected is recessed.

To achieve the object, the present invention provides an optical fiber connector comprising a connector ferrule having an end face serving as a connection end face side of the optical fiber connector, and an optical fiber fixed in the connector ferrule and protruding from the end face of the connector ferrule, wherein a central portion of the optical fiber including a core thereof protrudes from a peripheral portion thereof.

DETAILED DESCRIPTION OF THE PREFERRED EMBODIMENTS

Embodiments of the present invention will be hereinafter described in detail with reference to the accompanying drawings.

Figure 1:
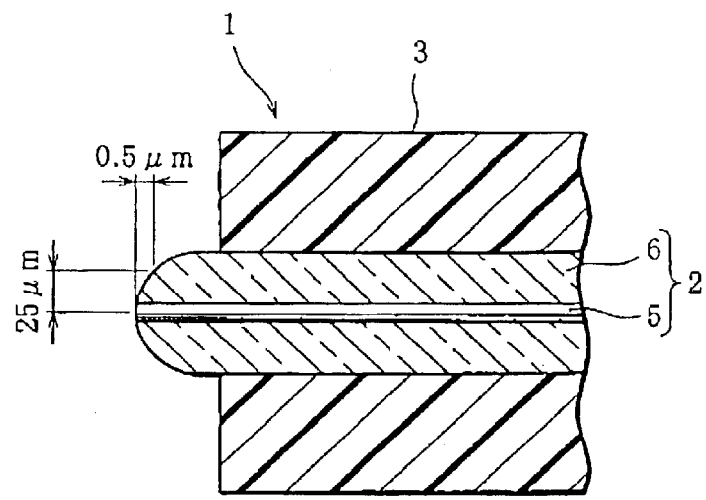
FIG. 1 is a sectional view showing a connection end face of an optical fiber connector according to one embodiment of the present invention.

FIG. 1 is a sectional view of an optical fiber connector according to a first embodiment of the present invention. The optical fiber connector 1 of this embodiment comprises optical fibers 2 and a connector ferrule 3 in which the optical fibers 2 are fixed. Each optical fiber 2 includes a core 5 and a cladding 6 surrounding the core 5, and the core and the cladding have the same diameters as those mentioned above. Also, in the optical fiber connector 1, each optical fiber 2 has a distal end portion protruding from the connector ferrule 3 by several micrometers.

In this embodiment, the end portion of the optical fiber 2 protruding from the connector ferrule 3 is in the form of a dome of which at least a circular tip portion having a radius of 25 μm and including the core 5 at its center has a radius of curvature of 650 μm or less. The dome-shaped end of the optical fiber can be obtained by laser beam machining or by mechanochemical polishing using cerium oxide, alumina, etc.

Consequently, in the circular tip portion of the dome, the outer periphery of the circular tip portion having a radius of 25 μm from the center of the core 5 is set back from the vertex of the dome, that is, the most prominent center of the core 5, by about 0.5 μm or more.

Figure 2:
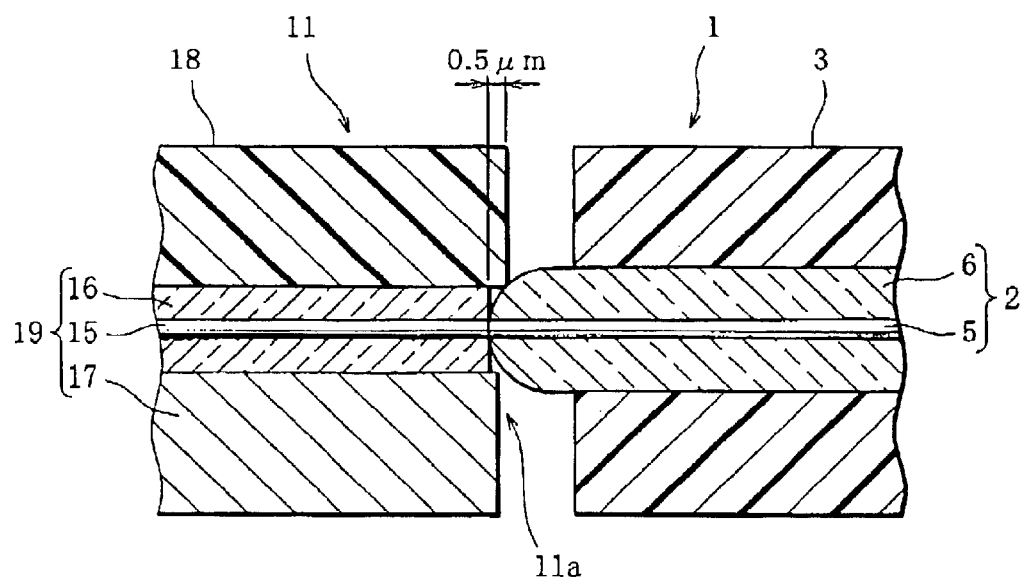
FIG. 2 is a sectional view illustrating a state in which the optical fiber connector of FIG. 1 is connected to an optical component.

FIG. 2 is a sectional view illustrating a state in which the optical fiber connector 1 of FIG. 1 is connected to an optical component 11. The optical component 11 comprises an optical waveguide chip 19 and a top plate 18 of epoxy resin or the like affixed to an upper surface of the optical waveguide chip 19. The optical waveguide chip 19 includes a substrate 17 of silicon or the like, a cladding 16 formed on the substrate 17, and cores 15 embedded in the cladding 16. The width and thickness of the cores 15 and the height of the cladding 16 are identical with the respective values mentioned above.

In the illustrated example, the optical component 11 has an uneven connection end face 11a, that is, the cores 15 and the cladding 16 are set back from the substrate 17 as well as from the top plate 18. The difference of unevenness between the core 15 and the top plate 18, which is the most prominent part in the example of FIG. 2, is about 0.5 μm.

As stated above, the optical fibers 2 protruding from the connection end face of the optical fiber connector 1 each have a dome-shaped end portion whose center coincident with the core 5 protrudes from the outer periphery of the aforementioned circular tip portion by about 0.5 μm. Accordingly, the cores 5 can come into contact with the respective cores 15 of the optical waveguide chip 11 insofar as the recession of the optical waveguide chip is not greater than a maximum of 0.5 μm or thereabout, thus permitting reliable PC connection.

Figure 3:
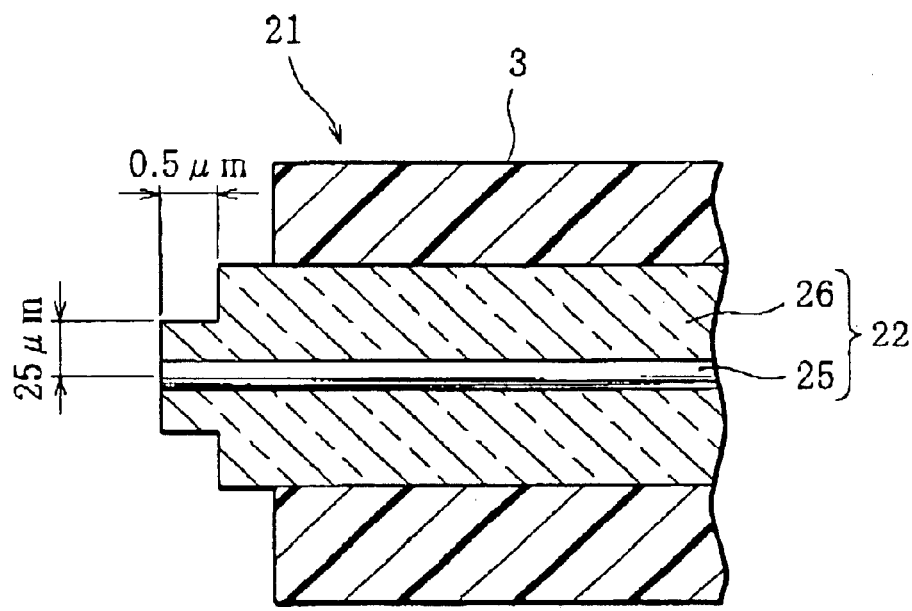
FIG. 3 is a sectional view showing a connection end face of an optical fiber connector according to another embodiment of the present invention.

FIG. 3 is a sectional view of an optical fiber connector 21 according to a second embodiment of the present invention. In this embodiment, optical fibers 22 protruding from the connector ferrule 3 each forms a concentric multi-step columnar end portion which includes a core 25 at its center. The tip of the end portion has a radius of 25 μm at a maximum, and protrudes from an outer peripheral portion of a cladding 26 by about 0.5 μm. Like the foregoing embodiment, the stepped end portion of the optical fiber can be obtained by laser beam machining or by mechanochemical polishing using cerium oxide, alumina, etc.

Also in this embodiment, the central portion of the optical fiber 22 including the core 25 and having a radius of 25 μm at a maximum protrudes from the outer peripheral portion of the optical fiber by about 0.5 μm. Accordingly, even in cases where the substrate or top plate of an optical waveguide chip protrudes by about 0.5 μm from the cores and the cladding of about 50 μm high, desirable PC connection can be established between the cores of the optical fibers and their respective cores of the optical waveguide chip.

Figure 4:
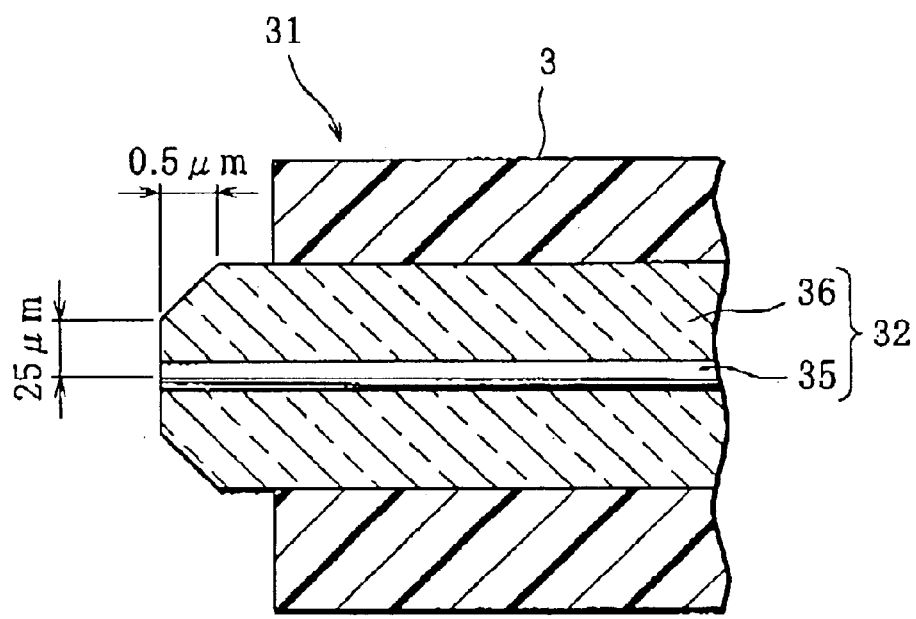
FIG. 4 is a sectional view showing a connection end face of an optical fiber connector according to still another embodiment of the present invention.
Figure 5:
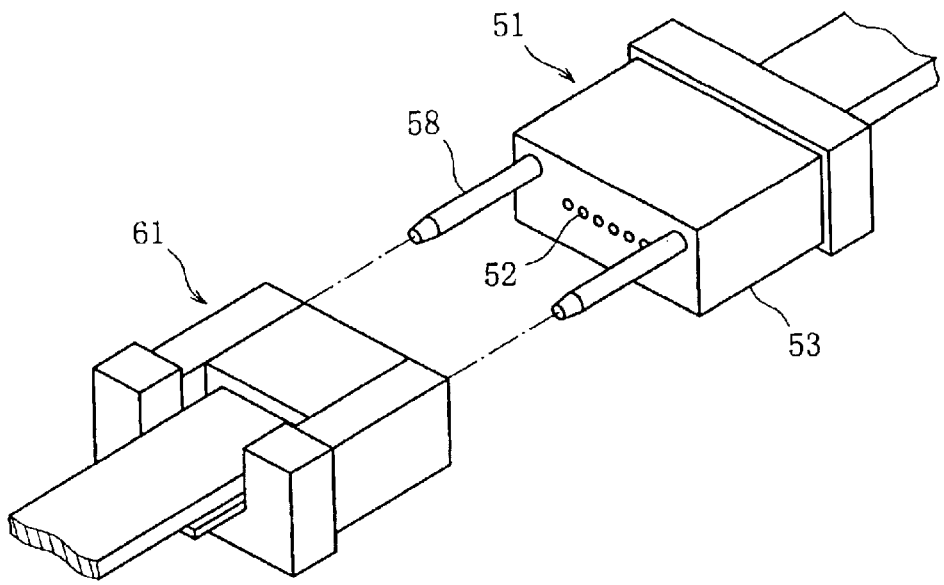
FIG. 5 is a perspective view illustrating how a conventional optical fiber connector is connected to an optical component.
Figure 6:
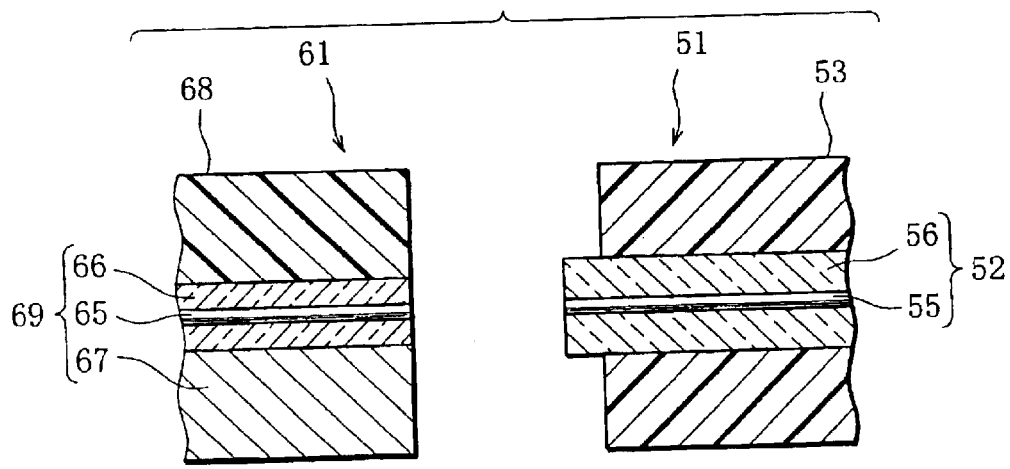
FIG. 6 is a longitudinal sectional view of the elements appearing in FIG. 5.
Figure 7:
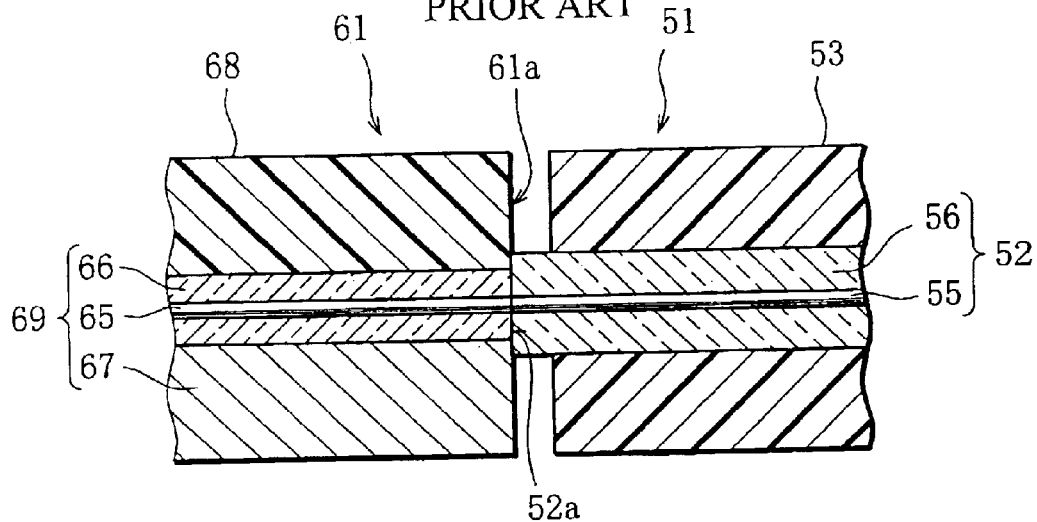
FIG. 7 is a sectional view illustrating an example of connection between the conventional optical fiber connector and the optical component.
Figure 8:
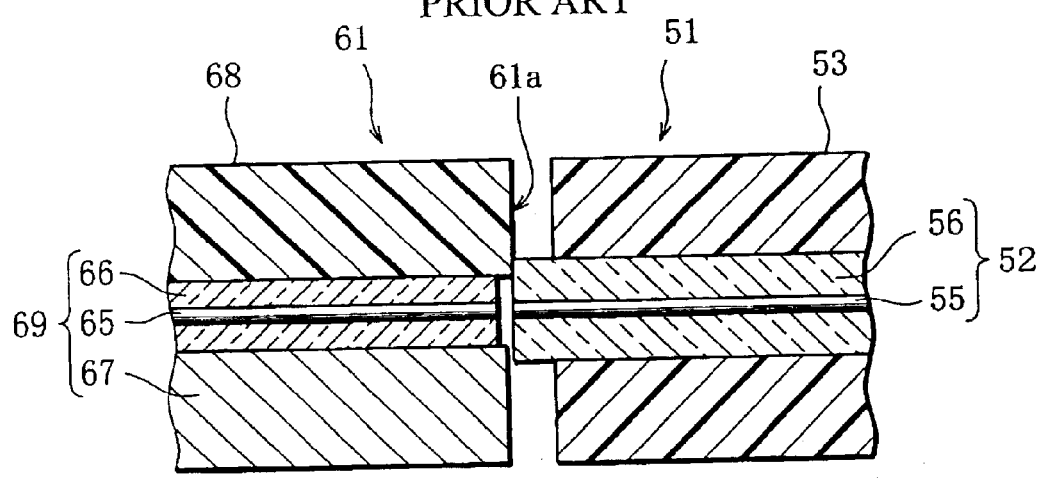
FIG. 8 is a view illustrating another example of connection between the conventional optical fiber connector and the optical component.

FIG. 4 is a sectional view of an optical fiber connector 31 according to a third embodiment of the present invention. In this embodiment, optical fibers 32 protruding from the connector ferrule 3 each have an end portion of which the peripheral edge of a cladding 36 is chamfered over a length of about 0.5 μm so as to leave a central portion including a core 35 at its center and having a radius of 25 μm at a maximum. Like the foregoing embodiments, the chamfered end portion of the optical fiber can be obtained by laser beam machining or by mechanochemical polishing using cerium oxide, alumina, etc.

Also in this embodiment, the central portion of the optical fiber 32 including the core 35 and having a radius of 25 μm at a maximum protrudes from the outer periphery of the tapered portion of the optical fiber by about 0.5 μm. Accordingly, even in cases where the substrate or top plate of an optical waveguide chip protrudes from the cores and the cladding of about 50 μm thick, desirable PC connection can be established between the cores of the optical fibers and their respective cores of the optical waveguide chip.

Some optical fiber connectors and optical components are polished such that their connection end faces are inclined at about 8' and not perpendicular. The present invention is also applicable to such optical fiber connectors in a manner such that the optical fibers each have a protruding end portion shaped as described above.

The optical fiber connector to which the present invention is applied includes various types of optical fiber connectors such as MT (mechanically transferable) connectors provided with multiple fibers, connection components having optical fibers arrayed and fixed in respective V-shaped grooves, etc. The present invention can be applied to such various optical fiber connectors in a manner such that the optical fibers each have a protruding end portion shaped as described above.

What is claimed is:

1. An optical device comprising:
   an optical fiber connector including
      a connector ferrule having an end face serving as a connection end face of said optical fiber connector, and
      an optical fiber fixed in said connector ferrule and protruding from the end face of said connector ferrule, a central portion of said optical fiber including a core thereof that protrudes from a peripheral portion thereof and has a tapered shape; and
   an optical component configured to be optically connected to said optical fiber connector, said optical component including
      an optical transmission portion exposed via an end of said optical component and configured to be brought into coaxial contact with an end of the optical fiber, a size of the optical transmission portion being smaller than a diameter of said optical fiber.

2. The optical fiber device according to claim 1, wherein the protruding central portion of said optical fiber is shaped like a dome having a vertex coinciding with an end face of the core.

3. The optical fiber device according to claim 2, wherein the dome-shaped portion of said optical fiber has a radius of curvature of 650 μm or less.

4. The optical fiber device according to claim 1, wherein the protruding central portion of said optical fiber is shaped like a concentric multi-step column of which a tip have a radius of about 25 μm or less from the center of the core and protruding from the peripheral portion.

5. The optical fiber device according to claim 4, wherein the tip of the column-shaped portion of said optical fiber protruding from the peripheral portion thereof has a length of 0.5 μm or more.

6. The optical fiber device according to claim 1, wherein the protruding central portion of said optical fiber is formed by chamfering a peripheral edge of said optical fiber so as to leave a circular portion with a radius of about 25 μm from the center of the core.

7. The optical fiber device according to claim 6, wherein said optical fiber is chamfered over a length of 0.5 μm or more.

8. The device of claim 1, wherein the optical transmission portion has an end face that is set back in an axial direction from the end of the optical component.

9. The device of claim 1, wherein said optical component further comprises:

a substrate, an optical waveguide disposed on the substrate so as to serve as said optical transmission portion; and a cover that covers the optical waveguide.

* * * * *